June 11, 1968 W. E. KELLEY ET AL 3,387,587
CULTURE SYSTEM

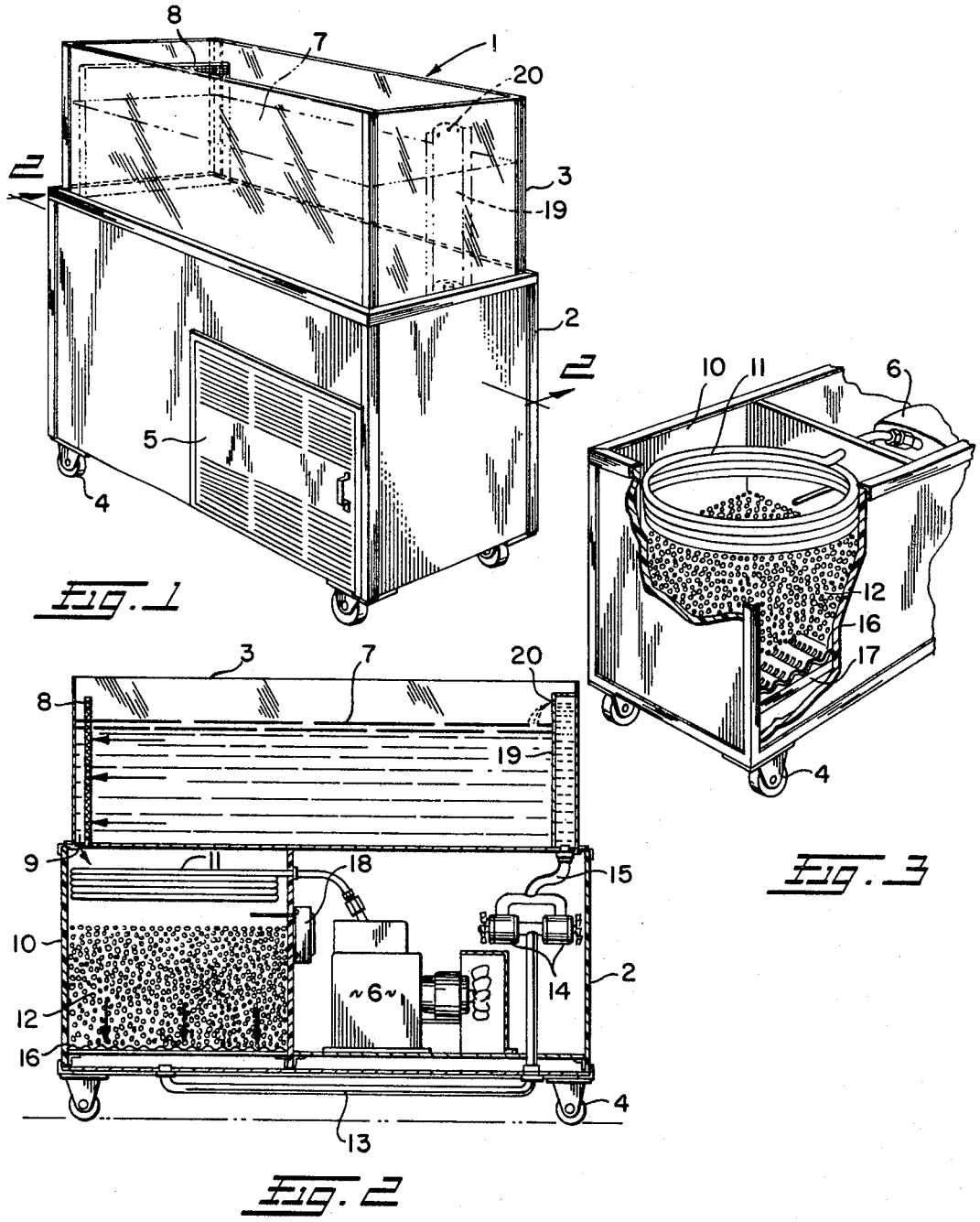

Filed March 7, 1967 2 Sheets-Sheet 2

INVENTORS.
WILLIAM E. KELLEY
JESSOP SMITH

BY Oberlin, Maky & Donnelly
ATTORNEYS.

3,387,587
CULTURE SYSTEM
William E. Kelley, Euclid, and Jessop Smith, Gates Mills, Ohio, assignors to Aquarium Systems, Inc., Wickliffe, Ohio, a corporation of Ohio
Continuation-in-part of application Ser. No. 492,693, Oct. 4, 1965. This application Mar. 7, 1967, Ser. No. 633,322
18 Claims. (Cl. 119—2)

ABSTRACT OF THE DISCLOSURE

A culture system for the maintenance of captive marine life including a housing and a tank in which such life are maintained and means for controlling the temperture of the culture medium within the tank. The culture medium is circulated through biochemical filtration means associated with the tank to react chemically therewith to replenish the alkaline reserve and to promote the growth of bacteria therein. Means are also provided to circulate the culture medium throughout the system and to aerate the medium as it is reintroduced into the tank to facilitate gas exchange of carbon dioxide and oxygen therewith.

---

This application is a continuation-in-part of our copending application, Ser. No. 492,693, filed Oct. 4, 1965, now abandoned, entitled "Culture System."

This invention relates generally as indicated to a culture system for the maintenance of captive marine life and more particularly relates to such a system in which biochemical filtration is employed to maintain the culture medium under the conditions most appropriate for the survival of such animals.

The use of aquariums for the maintenance and display of various forms of marine life in the home, schools and commercial institutions has, of course, been quite popular for a long number of years. In general, such aquariums have been fairly successful in maintaining these animals, but certain problems have been encountered, particularly in maintaining the more delicate forms of marine life, such as invertebrates. In the successful operation of a culture system, one of the most important factors is the maintenance of the culture medium in good condition. This task has proved to be especially difficult for inland aquariums which exhibit marine fish and invertebrates because of the difficulty involved in replacing sea water when it is no longer able to support the delicate marine life.

The available evidence indicates that depletion of the alkaline reserve in a marine aquarium system is the most important limiting factor in the maintenance of fishes and invertebrates and that ammonia is the next most important limiting factor as ammonia is extremely toxic to these forms of marine life, with the threshold values for acute ammonia toxicity varying from a few parts per million to less than one part per million. Moreover, there is considerable evidence that fish suffer ill effects such as inhibition of growth and partial asphyxiation within a few days time at concentrations well below those which are lethal. The problem of ammonia control is extremely difficult as it is constantly being produced in the system by excretion of aquarium animals and by the breakdown of organic substances in the culture medium during use.

In the past, marine aquariums were believed to duplicate the functions of the sea itself, but there are important distinctions between marine aquarium systems and the sea including the following:

(1) Both the alkali reserve and pH of the culture medium decreases;
(2) Nitrogen compounds appear in abundance starting with ammonia which must be oxidized to the nitrate form;
(3) The nitrate accumulates but may approach an equilibrium value as the result of denitrification;
(4) Bacteria numerically increase tremendously but with a great decrease of species;
(5) The total organic content of the water increases; and
(6) The magnesium content decreases while the potassium, calcium, phosphate and sulfate contents increase.

Because of such important distinctions, the culture system of the present invention does not necessarily attempt to duplicate the function of the sea but rather attempts to provide the best possible medium for the survival of the marine life. Pursuant to the achievement of this objective, one of the principal problems which is encountered is the depletion of the alkaline reserve of the culture medium by the acidifying action of the respiration of marine life introduced into the system and by mineralization of non-living organic materials, which are oxidative or acid forming processes. It is a principal object of the present invention therefore to provide a culture system in which the alkaline reserve of the culture medium can be efficiently controlled.

Another object of the present invention is the provision of a culture system in which the nitrogen content thereof is effectively controlled.

It is an additional object of this invention to provide a culture system and a process for maintaining captive marine life which is suitable for maintaining the more delicate forms of marine life satisfactorily over extended periods of time.

Yet another object of this invention is the provision of a culture system in which biochemical filtration is employed to control the alkaline reserve and nitrogen content of the culture medium.

Other objects, features and advantages of this invention will become apparent to those skilled in the art after a reading of the following more detailed description.

These and other objects are achieved by means of the present invention in which a culture system and process are provided for maintaining captive marine life utilizing a circulation system which is designed to efficiently remove acid forming carbon dioxide and in which the circulating water is exposed to calcareous particles to further reduce the acidity thereof and to replenish the carbonate alkalinity of the culture medium. As will be more fully explained hereinafter, the biochemical filtration serves not only to replenish and hence control the alkaline reserve of the culture medium but also to promote the growth of nitrifying bacteria which assist in minimizing the toxic effects of ammonia by oxidizing it to the nitrate form.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a perspective view illustrating one form of the culture system of this invention;

FIG. 2 is a section view along the line 2—2 of FIG. 1;

FIG. 3 is a fragmentary cut-away view illustrating in greater detail the bio-chemical filtration means of this invention;

Figure 4:
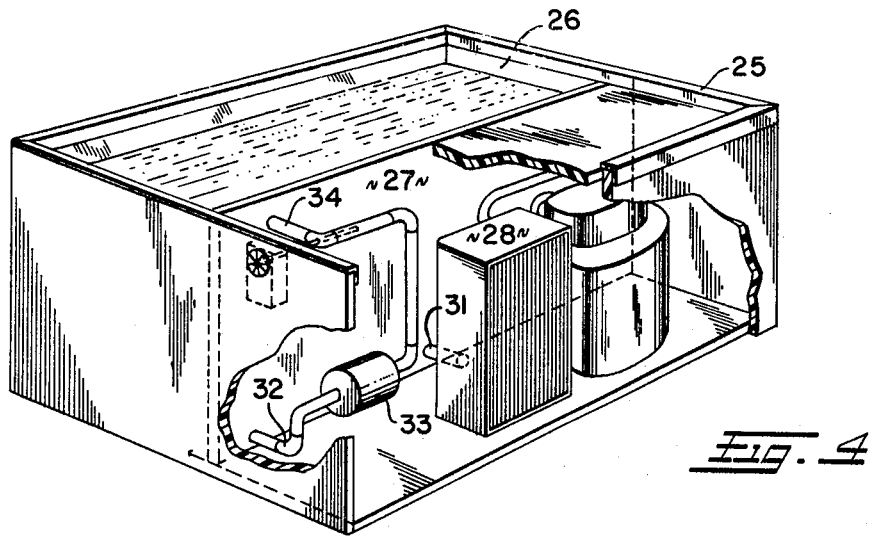
FIGS. 4 and 5 are perspective views illustrating another embodiment of this invention.

Referring now to the drawings and particularly to FIGS. 1-3, the culture system 1 comprises a housing 2 which has a tank 3 positioned thereon in which the marine life are maintained. To facilitate movement, it is mounted on rollers 4. A door 5 is provided for access to the interior of the housing in which a refrigeration unit 6 is provided. The refrigeration unit is of standard manufacture, and accordingly it will not be described in further detail.

A culture medium 7 is provided in the tank, and, in this embodiment, prefiltration means 8, which is preferably a block of foam material such as foamed polyurethane, is provided through which the culture medium is circulated to remove particles of organic materials therefrom which might otherwise contribute their nitrogen content to the formation of ammonia in the medium. As seen most clearly in FIG. 2, the culture medium passes from tank 3 through a series of openings 9 in the bottom thereof into a cabinet 10 which is provided in the housing adjacent the one end thereof. The interior of the cabinet is preferably coated with a suitable plastic or paint to insure that it is waterproof and non-toxic to the marine life, and cooling coils 11 and bio-chemical filtration means designated generally by the numeral 12 are positioned therein. The medium is thus circulated so that it passes through the coils, which are preferably of a plastic material to avoid development of a toxic condition in the medium, whereby the temperature is regulated into the bio-chemical filtration means from which it is drawn off through pipe 13, which is preferably positioned beneath the housing to facilitate more effective removal from the filter, into pumps 14 and circulated through pipe 15 back into the tank. Although not illustrated electrical immersion heating apparatus may also be associated with the filter to increase the temperature of the medium if necessary, although generally for most animals, cooling rather than heating will be required.

The bio-chemical filtration means 12 comprises particulate calcareous material which is supported near the bottom of the cabinet by means of corrugated perforated plate 16 which is positioned on a plurality of cross bars 17, only one of which is illustrated. The performations in plate 16 are preferably positioned in the lower surface of the corrugation and extend transversely thereof as illustrated to avoid "dead space" in the filtrant and to permit complete drainage through the plate. The filter and cooling coils also have a thermostat 18 associated therewith to assist in the temperature control.

After the water is drawn through the bio-chemical filter, it is recirculated to the tank and reintroduced into the culture medium therein through a slidable manifold 19 which has a plurality of openings 20 therein to spray and aerate the culture medium as it is reintroduced to facilitate removal of carbon dioxide by gas exchange with the medium. The manifold is thus designed to be movable vertically in a track or guide means so that the water flow may be adjusted and aeration may be controlled by adjusting the relationship between the openings and the surface of the culture medium or eliminated by raising the manifold above the surface of pipe 15. Although the aeration means illustrated has been found to be quite effective and is thus generally the preferred form, it is within the scope of the present invention to utilize other aeration means such as a T-shaped pipe arrangement with a plurality of openings therein, spraying, a stream of bubbles, an air stone, etc. Any such means of this type be employed, so long as it provides the desired aeration of the medium to remove the carbon dioxide therefrom and provides a high percentage of oxygen saturation during operation.

Figure 5:
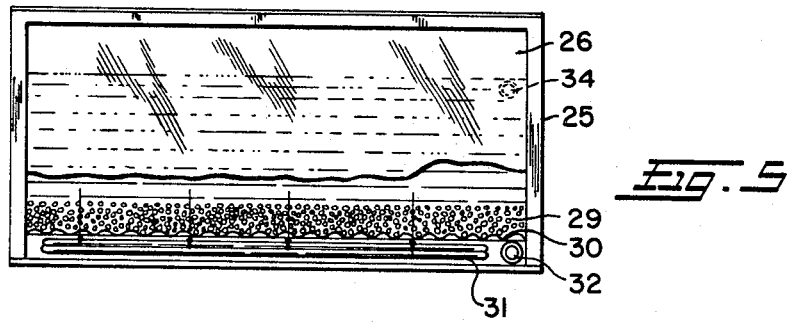
Figure 6:
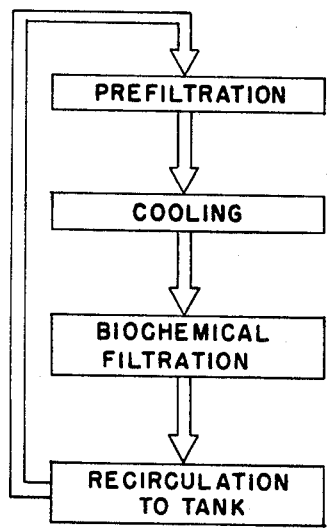
FIG. 6 is a block diagram illustrating the process of this invention.

Referring now to FIGS. 4 and 5, another embodiment of the present invention is illustrated. A housing 25 is provided with tank 26 therein in which the marine life are maintained. In this embodiment, the tank is separated by partition 27 from a compartment in which refrigeration unit 28 is positioined. The bio-chemical filter 29 is positioned adjacent the bottom of the tank 26 and is supported in such position by corrugated perforated plate 30 which is supported on cooling coils 31. The culture medium will thus be circuated down through the bio-chemical filter and perforated plate and past the cooling coils and be removed from the tank through pipe 32. The water will thereafter be circulated by pump 33 back into the tank through pipe 34. As in the previous embodiment, a thermostat 35 is used to assist in temperature control and means are provided for aerating the medium as it is reintroduced into the tank.

The bio-chemical filtration means used in this invention comprises a particulate calcareous material, such as coral gravel, crushed oyster shells, naturally occurring calcareous marble chips, limestone, dolomite, dolomitic limestone, etc. Especially good results have been obtained in the maintenance of various forms of marine life when the calcareous material is rich in magnesium, such as coral gravel or the other materials listed above in which there is sufficient magnesium content to increase the water solubility of the calcareous material at the pH and temperature set forth herein. In general such magnesium content, as for example, magnesium carbonate, should be at least approximately four percent by weight, although this may vary depending upon the particular material in question.

The particles size of the calcareous material may be varied depending upon the flow rate of the culture medium through the filter and the total effective surface area of the filter which is required to control the alkaline reserve of the medium, but it is preferred for most environments that the particle size be a minimum of approximately 2 mm. and normally within the range of from about 2 mm. to about 5 mm. Calcareous material such as coral gravel is preferred because it is extremely porous in nature and hence provides an effective surface area for the desired biological and chemical reactions which is far greater than expected in view of the particle size of the material.

During normal operation of the aquarium as the culture medium is circulated, the calcareous material will undergo a chemical reaction with the medium thereby producing bicarbonate ions and thus serving as a buffering agent and increasing the alkalinity of the medium. It is in this manner that the calcareous material acts as a chemical filter and controls the alkaline reserve of the culture medium.

Due to the porosity and surface area of the calcareous material, it will also function as a biological filter in the system to provide attachment sites for bacteria to grow which will nitrify the nitrogen appearing in the culture medium in the form of ammonia to the nitrate form in which it is relatively harmless to the marine life. For the successful maintenance of such life, it is essential that the nitrogen which initially appears as ammonia be oxidized to the nitrite and then to the nitrate form by the bacteria in a relatively short period of time, and hence a large effective surface area must be provided for the bacteria to grow upon and this surface area must be brought into contact with all of the water in the culture system. For satisfactory maintenance of the more delicate forms of marine life, a nitrogen content in the culture medium in the form of nitrates of less than 50 parts per million parts of the medium is desirable.

Another environmental factor which influences the nitrogen cycle of the culture system is the pH of the culture medium. For example, a low pH inhibits the oxidation of ammonia which is so extremely important to the achievement of satisfactory results. It has been found that satisfactory results are achieved when the pH of the culture medium is maintained at a minimum of approximately 8.0, with a pH of about 8.2 being preferred. Similarly, the temperature of the culture medium is important, since most marine organisms do not live well outside of their normal range in nature. For practical operations, the temperature should be maintained within the range of approximately 35 to 80° F. This upper temperature is approximately the ambient operating temperature in most installations and thus temperature control is usually a matter of cooling.

In the process of the present invention, the culture medium is circulated throughout the system in such a manner as to permit the medium to be in contact with the calcareous filtrant for a time sufficient to control the alkalinity of the medium and to promote the growth of the nitrifying bacteria. This flow rate will vary depending upon the size and effective surface area of the bio-chemical filter, but in general it has been found that the turnover rate of the medium through the filter should be a minimum of about 4 times per hour. Similarly, for best results, the flow rate of the medium through the calcareous filtrant should be approximately 2 gallons per square foot of surface area of a horizontal section of the filtrant per minute. The ratio of the filtrant volume to the weight of the animals being maintained should also preferably be at least about 1 cubic foot per pound of animal weight, and the ratio of the volume of culture medium to the living animal weight should preferably be approximately 100 gallons to about 2 pounds for the more delicate animals, although a greater weight of animals can be tolerated for the less delicate animals.

A particularly suitable culture medium for use in this invention is that disclosed in the co-pending application of Kelley and Segedi, Ser. No. 423,604, entitled "Synthetic Sea Water Composition."

The bio chemical filtration means used in this invention will normally consist entirely of the described calcareous material, but may, if desired, include certain other materials such as charcoal which would be used as an adsorbent in the filter.

If a large quantity of marine life is being maintained, the prefiltration means illustrated in the embodiment of FIGS. 1–3 is preferably used which serves as a physical filter or strainer in the system to remove the pieces of organic material in the culture medium which would otherwise contribute their nitrogen content to the formation of ammonia. In the form illustrated, the filter is simply a foam block, but other similar means may be used to achieve this purpose. Similarly, a diatomaceous earth filter, such as any of the standard commercially available accessory units, may be used periodically to remove such organic particles and clarify the water.

For special culture problems, other modifications may be made to the system, such as the employment of side-hung trays in the tank to accommodate many small compartments to isolate organisms under culture. Also, a mud, clay, sand, gravel, etc, substrate may be constructed over a fine nylon cloth placed on a perforated substrate plate positioned in the main body of the tank for the culture of bottom dwelling organisms.

Other modes of applying the principle of the invention may be employed, change being made as regards the details described, provided the features stated in any of the following claims, or the equivalent of such, be employed.

We therefore particularly point out and distinctly claim as our invention:

1. A culture system for the maintenance of captive marine lift comprising a housing, a tank positioned on said housing in which such marine life are maintained, means associated with said tank for controlling the temperature of a culture medium therein, bio-chemical filtration means comprising particulate magnesium rich calcareous material associated with said tank through which such culture medium is circulated to react chemically with such culture medium to replenish the alkaline reserve thereof and to maintain the pH of such medium at a minimum of approximately 8.0, said particulate material being of sufficient particle size and total surface area to provide attachment sites to promote the growth of nitrifying bacteria therein, and means to circulate such medium through said filter and to reintroduce such medium to said tank, said circulation means including means to aerate such medium upon reintroduction into said tank of facilitate gas exchange of carbon dioxide and oxygen with such medium.

2. The system of claim 1 in which said bio-chemical filtration means is positioned in the bottom of said tank.

3. The system of claim 2 including a perforated plate positioned near the bottom of said tank on which the calcareous material is positioned.

4. The system of claim 1 in which said particulate calcareous material is at least approximately 2 mm. in particulate size.

5. The culture system of claim 1 in which said particulate material is selected from the group consisting of coral gravel, crushed oyster shells, naturally occurring calcareous marble chips, limestone, dolomite and dolomitic limestone.

6. The culture system of claim 5 in which the magnesium content of said particulate material is at least approximately 4% by weight.

7. A culture system for the maintenance of captive marine life comprising a housing, a tank on said housing in which such marine life are maintained, means associated with said tank for controlling the temperature of the culture medium therein, a cabinet beneath said tank adjacent one end thereof, bio-chemical filtration means comprising particulate magnesium rich calcareous material positioned in said cabinet, means to circulate such culture medium through said bio-chemical filtration means and to reintroduce such medium to such tank, whereby the alkaline reserve of such culture medium is replenished by chemical reaction between such medium and said calcareous material and the pH of such culture medium is maintained at a minimum of approximately 8.0, said particulate material being of sufficient particulate size and total surface area to provide attachment sites to promote the growth of nitrifying bacteria therein, said circulation means including means to aerate such medium upon reintroduction into said tank to facilitate gas exchange of carbon dioxide and oxygen with such medium.

8. The system of claim 7 including prefiltration means in said tank whereby such medium is circulated therethrough prior to circulation through said bio-chemical filtration means.

9. A process for maintaining captive marine life comprising circulating a culture medium through the area where such marine life are maintained, circulating such medium through a bio-chemical filtration means of particulate magnesium rich calcareous material to react chemically with such material to replenish the alkaline reserve thereof at a rate sufficient to maintain the pH of such medium at a minimum of approximately 8.0, said particulate material being of sufficient particle size and total surface area to provide attachment sites to promote the growth of nitrifying bacteria in such medium, circulating such medium to such area where such marine life are maintained, and aerating such medium at the place of introduction into such area to facilitate gas exchange of carbon dioxide and oxygen with such medium.

10. The process of claim 9 in which the flow rate of the culture medium through the bio-chemical filtration means is approximately 2 gallons per square foot of surface area of a horizontal section of the filtration means per minute.

11. The process of claim 9 in which the turnover rate of culture medium through the filtration means is a minimum of 4 times per hour.

12. The process of claim 9 in which the ratio of the filtrant volume to the animal weight thus maintained is at least approximately 1 cubic foot to one pound of animal weight.

13. The process of claim 9 in which said particulate material is selected from the group consisting of coral gravel, crushed oyster shells, naturally occurring calcareous marble chips, limestone, dolomite and dolomitic limestone.

14. The process of claim 13 in which the magnesium content of said particulate material is at least approximately 4% by weight.

15. The culture system of claim 7 including a perforated corrugated plate positioned near the bottom of such tank on which said particulate calcareous material is positioned.

16. The culture system of claim 15 in which said perforations in said corrugated plate are in the lower surface of said plate to avoid dead space in said filtration means and to permit complete drainage through said plate.

17. The culture system of claim 16 in which said perforations extend transversely of the corrugations in said plate.

18. The process of claim 9 in which the pH of the culture medium is maintained within the range of approximately 8.0 to approximately 8.2.

References Cited
UNITED STATES PATENTS

| | | | |
|---|---|---|---|
| 2,594,474 | 4/1952 | McGrath | 119—5 |
| 2,672,845 | 3/1954 | Schneithorst | 119—5 |
| 3,025,831 | 3/1962 | Berardi | 119—2 |
| 3,146,195 | 8/1964 | Berardi | 119—5 X |

HUGH R. CHAMBLEE, *Primary Examiner.*